United States Patent [19]

McCollum et al.

[11] Patent Number: 5,298,756
[45] Date of Patent: Mar. 29, 1994

[54] SCINTILLATOR FIBER OPTIC LONG COUNTER

[75] Inventors: Tom McCollum, Sterling; Garry B. Spector, Fairfax, both of Va.

[73] Assignee: Fibertek, Inc.

[21] Appl. No.: 961,661

[22] Filed: Oct. 16, 1992

[51] Int. Cl.⁵ .............................................. G01T 3/06
[52] U.S. Cl. ........................ 250/390.07; 250/390.11; 250/390.12
[58] Field of Search ............... 250/370.05, 390.01, 250/390.07, 390.11, 390.12, 390.08, 265, 269, 390.10

[56] References Cited

U.S. PATENT DOCUMENTS

| | | | |
|---|---|---|---|
| 2,556,768 | 6/1951 | McKibben | 250/390.01 X |
| 3,264,477 | 8/1966 | Hall, Jr. | 250/390.01 X |
| 4,837,442 | 6/1989 | Manglos | 250/390.12 X |

FOREIGN PATENT DOCUMENTS

| | | | |
|---|---|---|---|
| 1-152390 | 6/1989 | Japan | 250/390.01 |
| 655212 | 12/1975 | U.S.S.R. | 250/390.01 |

*Primary Examiner*—Constantine Hannaher
*Assistant Examiner*—Edward J. Glick

[57] ABSTRACT

A flat response position sensitive neutron detector capable of providing neutron spectroscopic data utilizing scintillator fiber optic filaments embedded in a neutron moderating housing having an open end through which neutrons enter to be detected.

7 Claims, 11 Drawing Sheets

FIG. 1 (AMENDED)

FIG. 2A (AMENDED)

FIG. 2B (AMENDED)

SCINTILLATOR FIBER OPTIC LONG COUNTER

CONTRACTUAL ORIGIN OF THE INVENTION

The invention described herein was made in the course of or under Contract DE-FG05-90ER81022 with the U.S. Department of Energy.

BACKGROUND OF THE INVENTION

The invention relates to detection of neutrons by a moderating, position sensing detection system. The system discriminates neutrons from gamma rays via pulse height analysis. By detecting the absorption position of a neutron along the detection element, neutron spectroscopic data can be collected. The system maintains a flat response over a wide range of incident neutron energies.

Various methods of measuring neutron energies have been employed based on moderation of fast neutrons. These detection schemes involve the placement of thermal neutron detectors within a moderating medium. Early experiments used a large water bath as the moderator. Count rates obtained at different depths were used to provide crude spectroscopic data. More recently, a rudimentary neutron spectrometer was developed using a lithium iodide scintillator placed at the center of polyethylene moderating spheres of different diameters (Bonner spheres). Information regarding neutron energy of an unknown source was acquired by measuring count rates obtained with each of the moderating spheres and comparing these results to calibration curves. The deconvolution process, as well as the redundant experimental procedures required, makes these spectrometers cumbersome, limiting their use.

A neutron spectrometer based on total energy absorption in a liquid scintillator moderator and a coincident capture by $^6$Li-loaded glass plates immersed in the liquid is disclosed in U.S. Pat. No. 4,931,649 issued on Jun. 5, 1990 to Czirr and Jenson. A complicated signal processing system is required to perform the various tasks of coincident analyses, pulse-shape discrimination, and pulse-height analysis.

SUMMARY OF THE INVENTION

Since currently available detectors do not offer the combination of flat response and spectral data, it is therefore an object of the invention to provide a solid state, rugged detection system with a flat response over a wide energy range capable of performing neutron spectroscopy. Spectroscopy is accomplished via position sensing of thermalized neutrons within a moderator, since the penetration depth required for thermalization is related to the incident neutron energy. Gamma-ray rejection is accomplished by pulse height discrimination.

The invention is directed to a neutron detector comprising a detection element, photomultiplier tubes, signal processing electronic components and moderating/shielding material. The detection element comprises an array of $^6$Li-loaded scintillator glass fiber optics in a light tight housing. The detection element is coupled at each end to a photomultiplier tube. Neutron moderating material surrounds the detection element. In addition, a thermal neutron shield surrounds the inner moderating cylinder. Finally, a neutron moderating cylinder surrounds the thermal neutron shield.

DESCRIPTION OF THE PREFERRED EMBODIMENT

Figure 1:
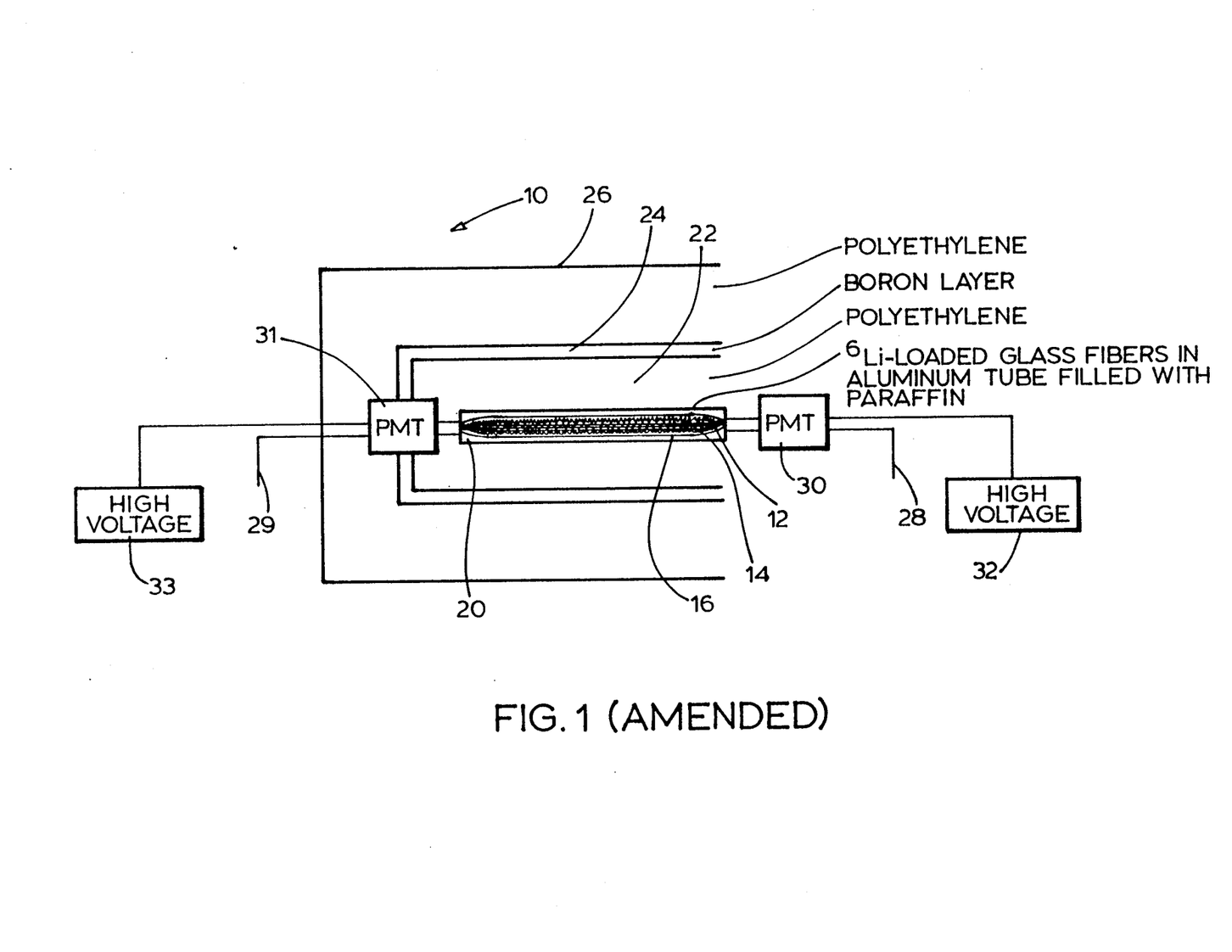
FIG. 1 is an illustration of the detection system of the fiber optic long counter system.

FIG. 1 shows the details of the detection system 10. In the preferred embodiment, detection element 12 is seen to be $^6$Li-loaded glass scintillator fibers 14. Scintillation light from the glass fibers 14 is detected on each end by photomultiplier tubes (PMT's) 30, 31, powered by high voltage power supplies 32, 33. Signal outputs from PMT's 30, 31, are identified by the numbers 28, 29 respectively. The $^6$Li glass can be produced using several different lanthanide dopants (Cerium or Terbium) which affect various properties of the scintillation emission, including wavelength and fluorescence decay time (the duration of the scintillation pulse). Cerium doped glass emit at a blue wavelength of approximately 400 nm and has a fast decay time of about 50 ns, while terbium doped glass emits at a yellow wavelength of 550 nm and has a slow decay time of approximately 1 ms. Each type has inherent advantages and disadvantages. Cerium doped glass provides the best wavelength matching for detection by PMT's and the advantageous fast decay time, but unfortunately suffers from higher attenuation than terbium doped glass. For this reason, the preferred embodiment of the scintillator fiber optic long counter uses terbium doped fibers, although cerium doped fibers could be used depending on the requirements of the particular application.

Equivalent systems can be fabricated with thermal neutron sensitive liquid scintillators encased in glass filament tubes, lithium or boron loaded glass rods or coiled fibers. Surrounding the fibers is a thin walled aluminum (or equivalent) light tight tube 16. In the preferred embodiment, paraffin wax 20 is heated to liquid form and poured into the aluminum tube to provide moderator material. It is understood that any moderating material such as polyethylene may be used.

Such material should possess a high concentration of hydrogen atoms. Hydrogen atoms have a similar mass as that of neutrons so that upon colliding the neutron slows (loses energy). The ends of fibers 14 are polished, and the detection element coupled, using index matching gel, to the face of a bialkali photocathode photomultiplier tube 30, 31.

Tube 16 is surrounded by a cylinder of polyethylene 22 (or other suitable moderator, i.e. paraffin). Cylinder 22 is cut into two half cylinders to facilitate removal of the detection element 12. The two halves are connected by screws using threaded holes in the moderator. The polyethylene cylinder 22 is surrounded on all sides except the front face by a thermal neutron shield 24 (boron oxide, cadmium foil, or the equivalent). The entire assembly (except the front face) is then enclosed in a larger polyethylene (or similar high-hydrogen-content) moderating cylinder 26.

Neutron barrier 24 in the preferred embodiment is comprised of a layer of boron and is an effective shield for slow or low energy neutrons commonly referred to as thermal neutrons. Moderator 26 surrounds boron layer 24 and serves to retard the speed of neutrons to thermal energies. The combined effect of barrier 24 and moderator 26 thus shields all neutrons incident from the sides and rear of detection system 10.

It can be seen from the foregoing explanation that the only neutrons that are detected by detection system 10 are those that enter through the front face thereof. A neutron that enters the front face of detector 10 will be slowed down as it travels through moderator 22.

As indicated above, the high hydrogen content of moderator 22 is effective to slow or reduce energy of the neutron. When the neutron is slowed to its thermal energy it is detected by fibers 14. Those neutrons that are not slowed to thermal energy exit the detector 10 undetected.

Figure 2A:
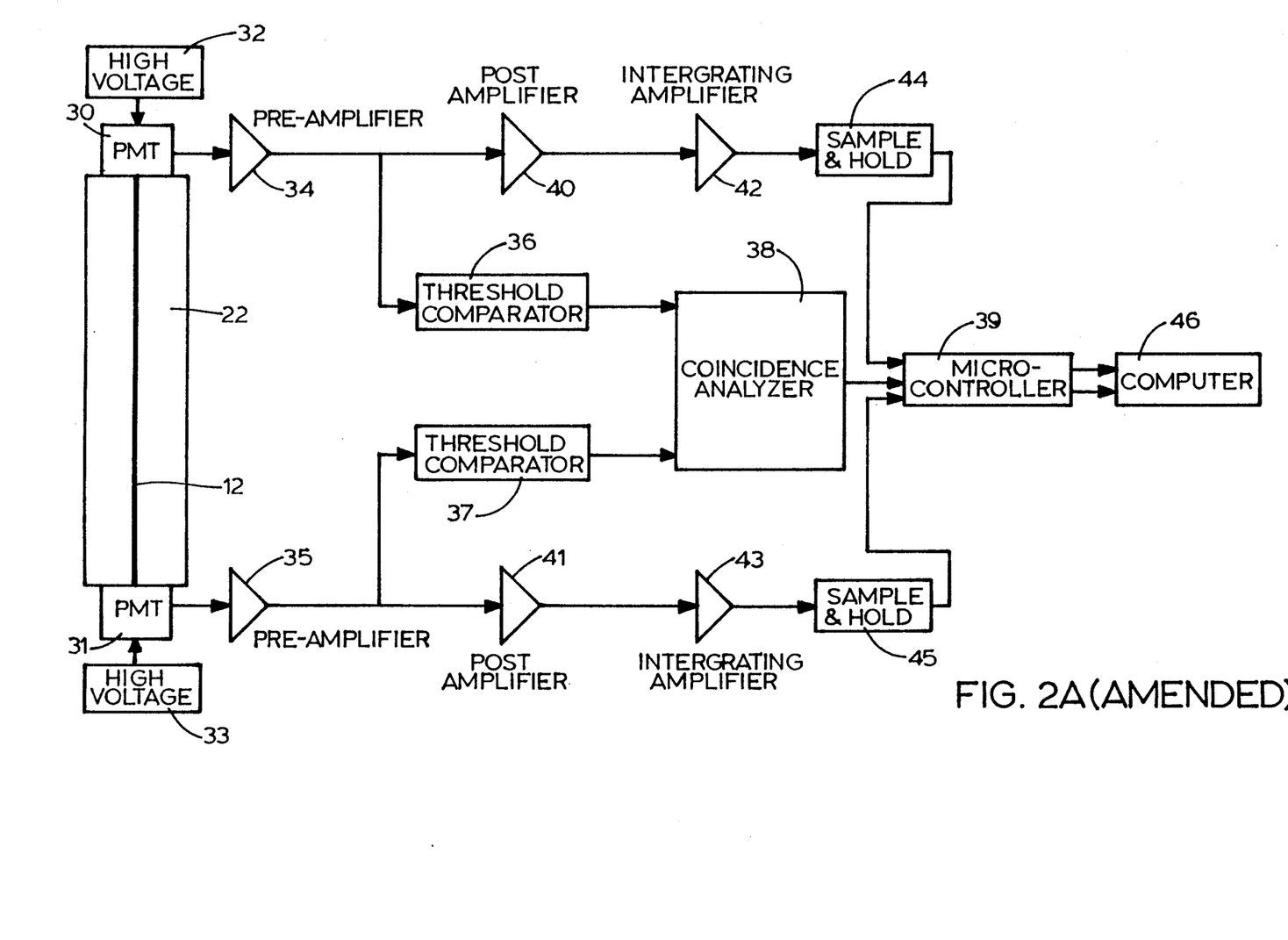
FIG. 2A is a block diagram of the complete system, including the signal processing electronic components.
Figure 2B:
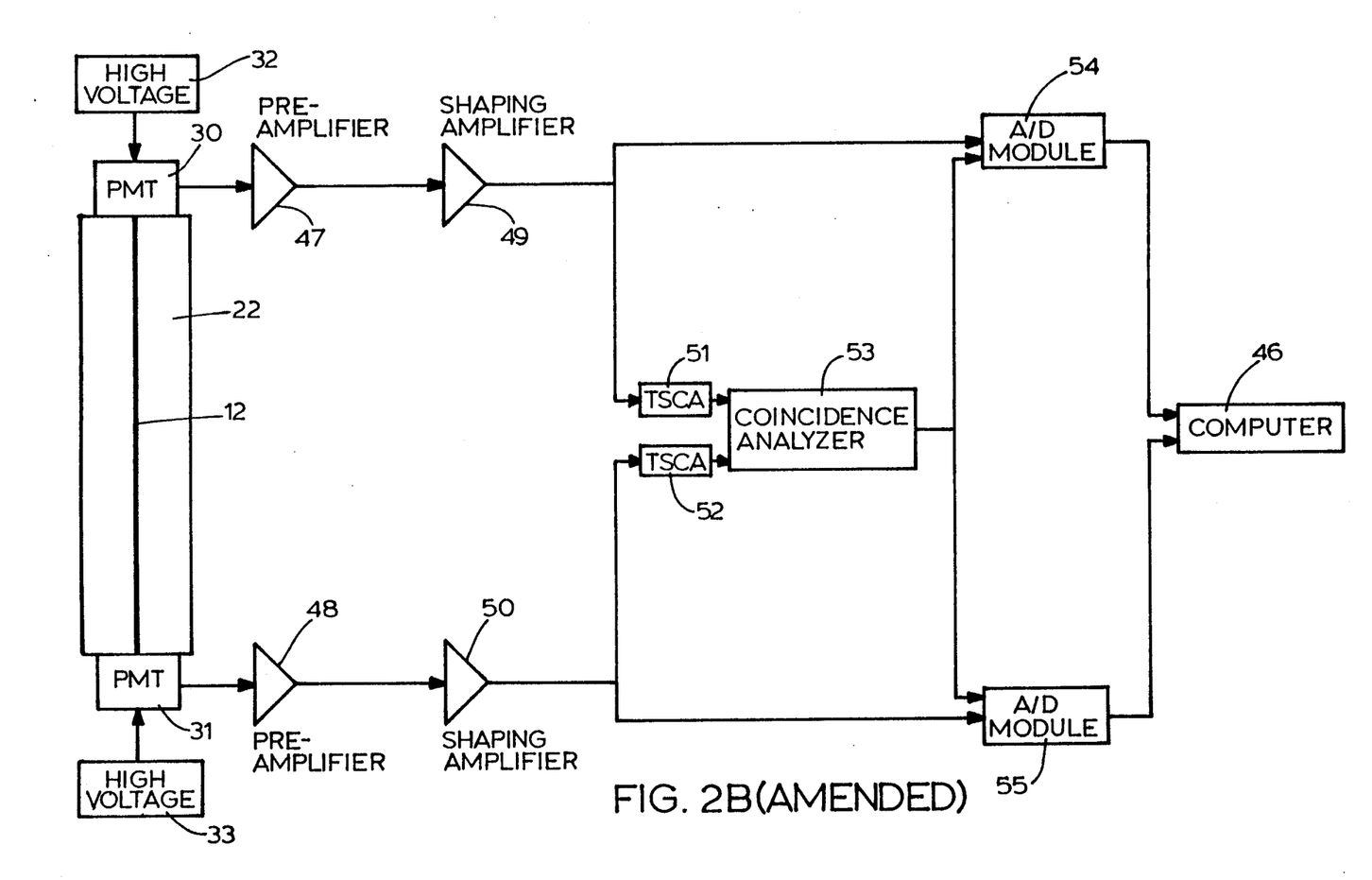
FIG. 2B is similar to that of FIG. 2A wherein cerium doped glass is utilized as the detection means.

FIGS. 2A and 2B illustrate the incorporation of the detection element/moderator assembly with the signal processing electronics hardware. It can be seen that photomultiplier tubes (PMT) 30, 31 is positioned on each end of the detection element 12, each powered by a high voltage power supply 32, 33. An interaction of a neutron or gamma ray in the glass fibers 14 causes a scintillation event generating photons emitted in all directions. A fraction of these photons will be guided to both ends of the scintillating fiber by total internal reflection. Since the speed of light is very fast and the length of the fiber 14 is short, the scintillation light will exit each end of the fiber 14 at approximately the same time. Therefore, neutrons or gamma rays which interact in the glass will result in coincidentally detected signals at each end of the fiber 14. Comparison of these coincident pulses is required for determination of neutron impact position. Signals occurring on only one of the PMT's 30, 31 are ignored, since they are a result of either background pulses from the PMT or scintillation events that are too small to be detected on both ends of the fiber 14.

The signal detection and processing electronics convert the coincident pulses sensed by the PMTs 30, 31 to electrical pulses. The use, in the preferred embodiment, of terbium doped fibers having, as explained above, a slow decay time necessitated the use of pulse processing components that were not commercially available. Referring to FIG. 2A the general purpose preamplifier 34, 35 is used to convert the collected charge PMT pulse into a voltage pulse, and also serves to amplify and shape the pulse. The preamplifier output is split into two branches.

One branch is used to eliminate background and noise pulses by amplitude discrimination and to determine if coincident pulses are present on both PMTs 30, 31. The threshold comparators reject any pulses with an amplitude smaller than a preset threshold level.

Pulses greater than the threshold level are passed to the coincident analyzer 38. If two pulses from the two separate detectors are received by the coincidence analyzer 38 within a predetermined time interval (adjustable from 50 $\mu s$ to 1 ms) a pulse is sent to the microcontroller 39.

The other branch is then sent to a post amplifier 40, 41 for additional gain. Following this, an integrating amplifier 42, 43 with a time constant of approximately 3 ms is used to provide an output pulse amplitude corresponding to the summation of the post amplified pulse over a 3 ms time interval (3 ms is the approximate duration of the scintillation pulse for this type of glass). This is done to collect the entire scintillation pulse. The peak amplitude of the integrated pulse is maintained by a sample and hold circuit 44, 45 for subsequent A/D (analog to digital) conversion.

An A/D convertor resident in the microcontroller 39 is used to convert the peak height of the integrated pulse into a digital value. The microcontroller 39 performs A/D conversions only for pairs of coincident pulses, both of which exceed the threshold level set on the comparator 36, 37 (i.e. only when the gating pulse from the coincident analyzer 38 is present).

The pair of digital values from each coincident pulse are sent to a computer 46 through an RS-232 interface. The microcontroller 34 then resets the sample and hold circuits 44, 45 and digital registers in order to analyze subsequent pulses. The computer 46 can be used for various aspects of data reduction, including determination of absorption position (which leads to energy spectroscopy), and pulse height analysis which is used to isolate neutron induced scintillations.

In the event cerium doped glass fibers are utilized most of the components used for signal processing can be obtained commercially, since scintillation pulses of this type are common in nuclear radiation detectors. The signal processing chain used for analyzing these fast decay pulses is shown in FIG. 2B. A fast scintillation preamplifier 47, 48 (Canberra 2005 or equivalent) converts the collected charge pulse from the PMT 30, 31 into a voltage pulse, and serves to amplify and shape the pulse. The long tail of the preamplifier output pulses can cause an undesirable pile-up of pulses on the tail of preceding pulses which have not fully decayed to zero. This affects the amplitude of the pulse, which carries the basic information, since each pulse can be superimposed on a different baseline level. For this reason, the output pulses from each preamplifier 47, 48 are reshaped into much shorter pulses in a way which does not affect the maximum amplitude above baseline. The reshaping amplifiers 49, 50 (Canberra 2020 or equivalent) perform this task and also provide additional gain.

The output from each shaping amplifier 49, 50 is then split. One branch is used to determine if the pulse is coincident with a pulse detected on the opposite PMT. To accomplish this, the shaped pulses are sent to a timing single channel analyzer 51, 52 (TSCA) (Canberra 2035A or equivalent) which provides a precisely delayed logic output pulse for any input pulse whose amplitude exceeds a predetermined amplitude threshold level, rejecting pulses smaller than the threshold level. The coincident analyzer 53 (Canberra 2040 or equivalent) emits a logic pulse if it receives a logic pulse from both TSCA's 51, 52 within a predetermined time interval, therefore identifying coincident pulses.

The other branch from each shaping amplifier output is sent directly to an A/D module 54, 55 (analog to digital) which is used to convert the peak amplitude of the pulse into a digital value. The A/D module 54, 55 sends these values to the computer 46 only if it receives the logic pulse from the coincident analyzer 53 indicating that there is a corresponding coincident pulse present. The computer 46 can be used to process the digital data in different ways to determine absorption position (which leads to energy information), to perform pulse height analysis to isolate neutron events, and perform other forms of data reduction.

Figure 3:
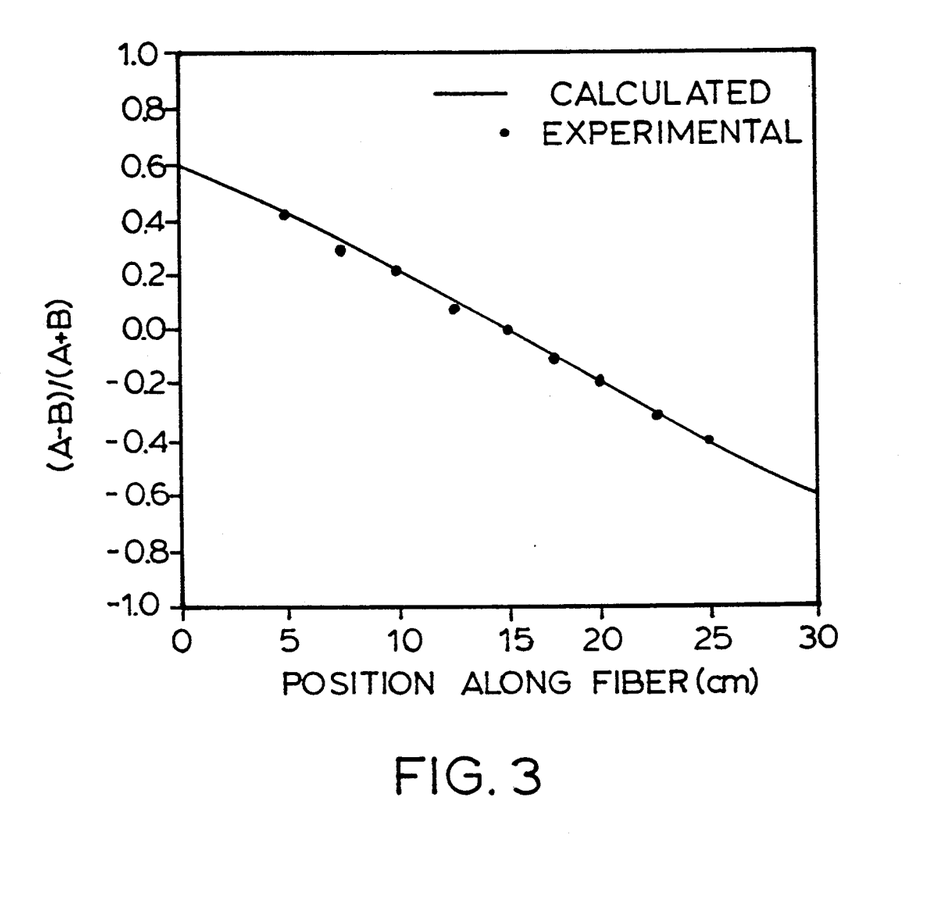
FIG. 3 shows the neutron absorption position, $(A-B)/(A+B)$ plotted as a function of axial distance along a 30 cm detection element.

The absorption position of thermal neutrons in the lithium glass fibers is determined by comparing the pulse heights (A and B) of coincident signals 28, 29 on the two PMT's 30, 31 located at each end of the fiber 14. A and B correspond to the pulse heights obtained from PMT's 30 and 31, respectively. A and B are exponentially dependent on the length of travel of the scintillation light through the fiber, due to attenuation of light in the fiber. A formula can be derived to calculate the absorption position as a function of the quantity $(A-B)/(A+B)$. In the long counter configuration, absorption position is a measure of the thickness of moderator which was required for the neutron to be thermalized. From absorption position information, an estimate can be made of the incident energy of detected neutrons, since higher energy neutrons penetrate further into the moderating cylinder before being thermalized. A mathematical model of neutron moderation or in the alternative, an experimental calibration can be utilized to relate the absorption position of a neutron to its energy level. Thus the normalized differential between the two PMT outputs, 28, 29 $(A-B)/(A+B)$, corresponds to the absorption position of the thermal neutron along the fiber detection element 12, due to the light attenuation in the fibers 14. FIG. 3 illustrates the calibration $(A-B)/(A+B)$ vs. axial position for a 30 cm detection element. Average values of A and B were collected using a neutron source located at predetermined positions. The curve fit is the result of a calculation of photon output for a fiber with a 1/e attenuation length of 22.5 cm. FIG. 3 clearly demonstrates the position sensing capability of the fibers. The calculated fit based on the measured fiber attenuation is in close agreement. $(A-B)/(A+B)$ is nearly linear for the 30 cm fiber, making deconvolution of raw data into position information a simple task.

Figure 4:
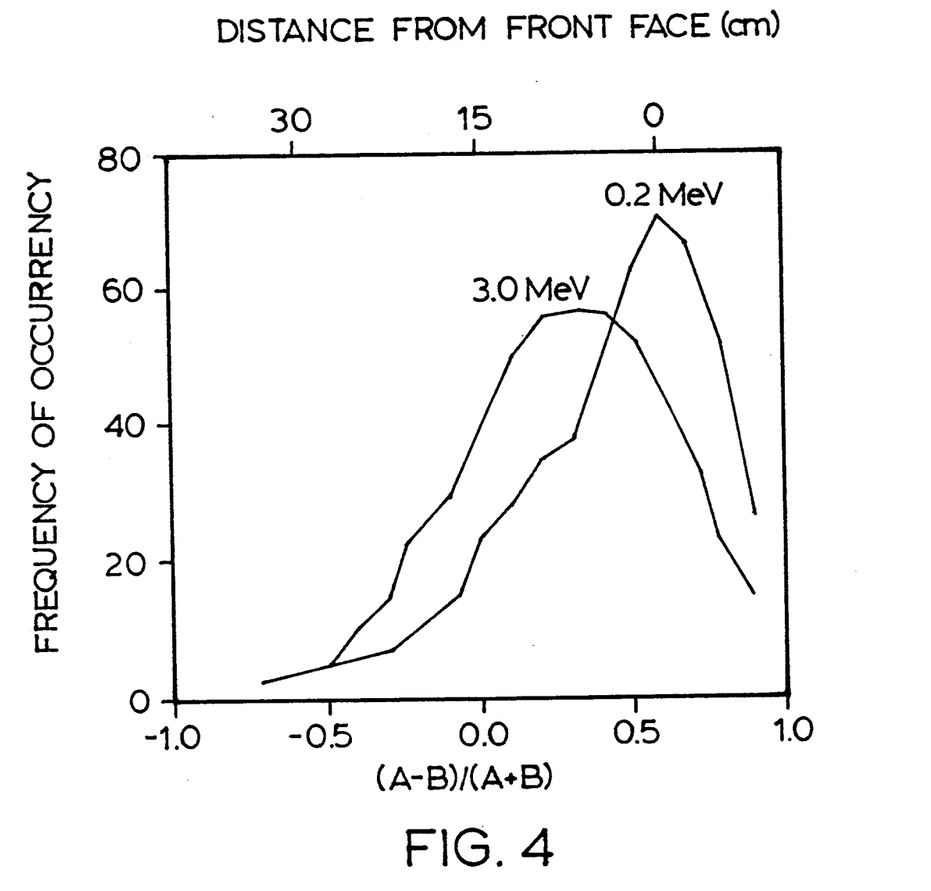
FIG. 4 is the response of a prototype long counter system to 0.2 MeV and 3.0 MeV neutrons.

FIG. 4 shows the performance of the fiber optic long counter system in distinguishing between 0.2 MeV and 3.0 MeV neutrons from a monoenergetic source of neutrons (Van de Graaff generator, lithium target).

In many applications of neutron detection, intense fields of gamma radiation are also present. It is therefore desireable to be able to discriminate between gamma rays and neutrons in a mixed field. $^6$Li-loaded glass was selected for this application, in part because of its good capability of gamma and neutron discrimination. Using $^6$Li-loaded glass, gamma rejection is accomplished by using the method of pulse height discrimination. The amplitude of scintillation pulses produced by neutrons are usually much greater than those produced by gamma rays. Pulse height discrimination rejects gamma ray signals simply by ignoring all pulses smaller than a predetermined amplitude.

Neutron scintillation pulses are more intense than most gamma ray scintillation pulses because of the differing nature in which neutrons and gamma rays interact in the lithium loaded scintillation glass. A neutron which reacts with a $^6$Li nucleus will produce a triton and an alpha particle directed oppositely. Through various energy transfer processes with the lanthanide ions in the glass, a constant fraction of the energy of the reaction products is converted into scintillation light. Therefore, slow neutrons will produce nearly equal amounts of scintillation light giving rise to a characteristic neutron peak in pulse height analysis. Conversely, the predominant reaction mechanism for gamma rays in the glass is Compton scattering. A gamma ray will interact with an electron in the scintillator and be scattered to a lower energy, transferring some of its energy to the electron. Further interaction of this recoil electron with the lanthanide ions then result in some of its energy being converted into scintillation light. However, the amount of scintillation light produced by Compton scattering is not a constant fraction of the energy of the incoming gamma ray, since only partial energy transfer occurs in the scattering process. Since usually only a small fraction of the gamma ray energy is deposited in the scintillator, the scintillation pulse from a gamma ray is usually much smaller than that from a neutron interaction.

It is also noted that gamma rays and neutrons can be distinguished by pulse shape discrimination, although that method is not used in the preferred embodiment. Scintillation pulses from gamma rays and neutrons have different temporal shapes. Pulse shape discrimination is commonly used to examine the time characteristics of scintillation pulses in order to separate gamma rays and neutron scintillations.

Figure 5A:
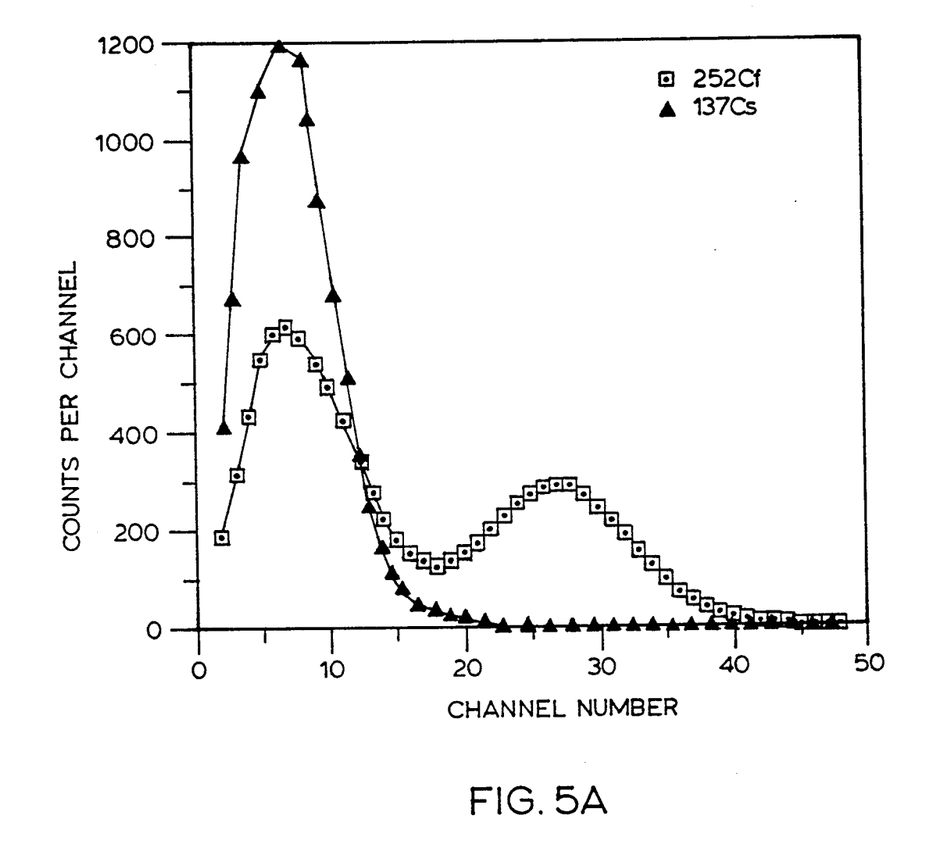
FIG. 5A is the pulse height spectra of $^{137}$Cs gamma rays and moderated $^{252}$Cf neutrons collected by a 30 cm detection element.
Figure 5B:
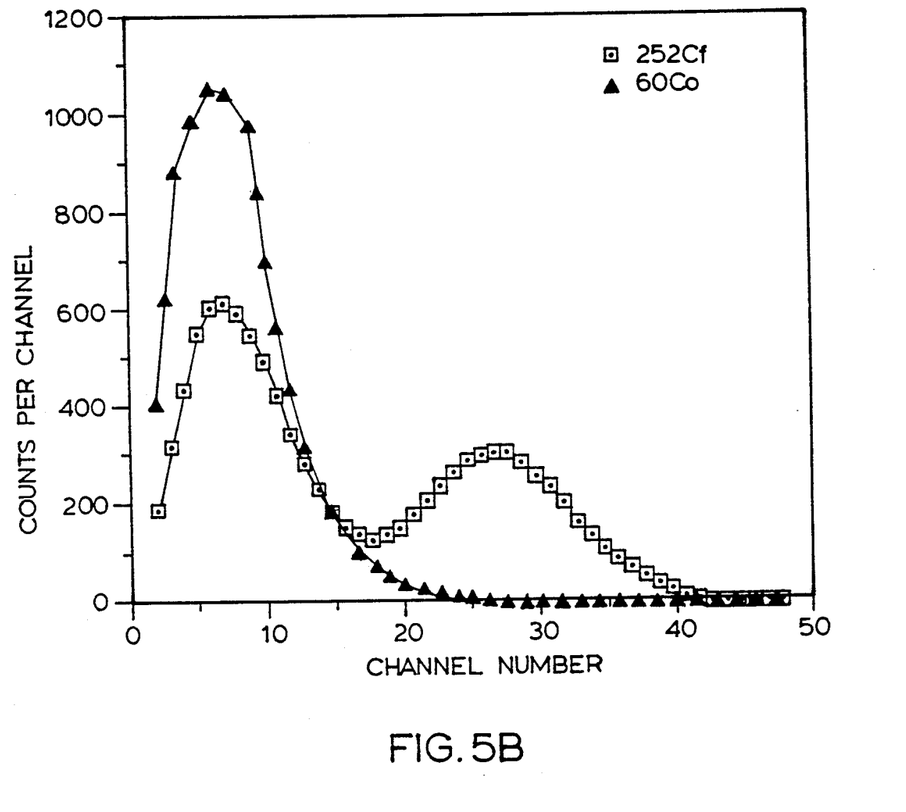
FIG. 5B is the pulse height spectra of $^{60}$Co gamma rays and moderated $^{252}$Cf neutrons collected by a 30 cm detection element.

Effective discrimination between thermal neutrons and 0.66 MeV ($^{137}$Cs) and 1.2 MeV ($^{60}$Co) gamma rays is shown in FIGS. 5A and 5B using a 30 cm long detection element. The thermal neutron peak is clearly evident (at approximately channel number 28). The figure demonstrates that the majority of gamma induced scintillations can be rejected by pulse height discrimination, without affecting the detection of neutrons.

Figure 6:
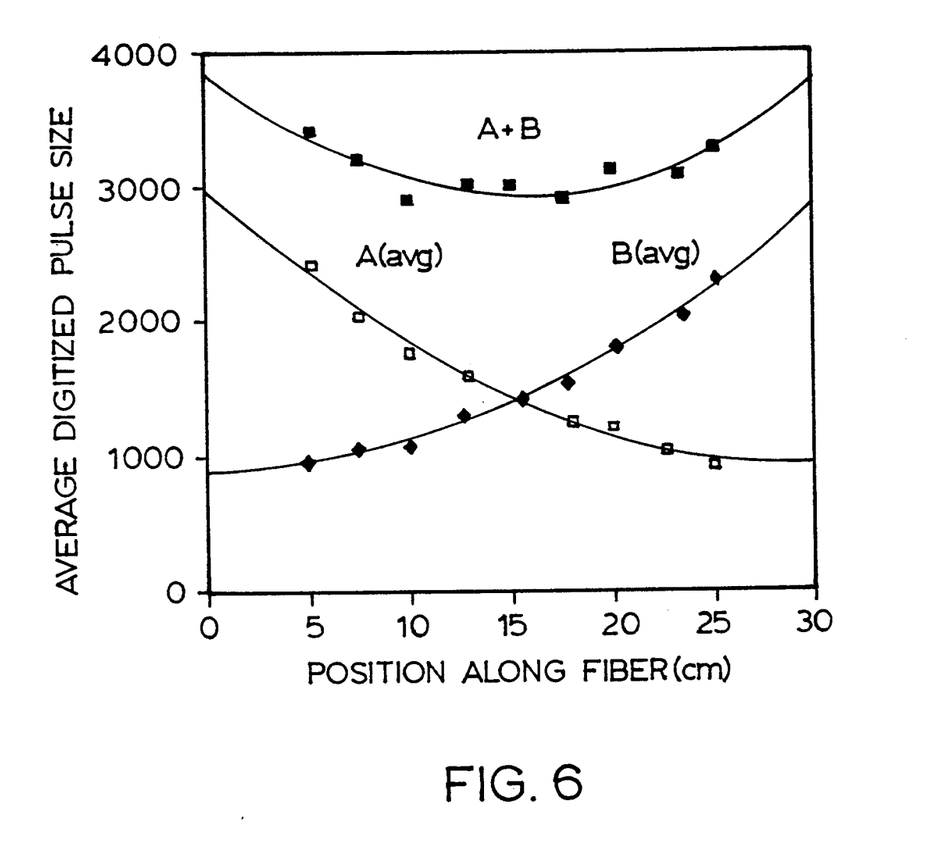
FIG. 6 is the average pulse size recorded by PMT's A and B using moderated $^{252}$Cf neutrons with a 30 cm detection element. The average pulse sum, $A+B$, is also plotted.

FIG. 6 plots amplitudes A, B, and the sum $A+B$ vs. axial position for a 30 cm detection element. The exponential attenuation of the scintillation light can be observed in the A and B data. The sum $A+B$ is reasonably flat, and does not vary more than 10% from the mean over the length of the fiber. The flatness of $A+B$ provides a response of the detector element independent of absorption position.

Figure 7:
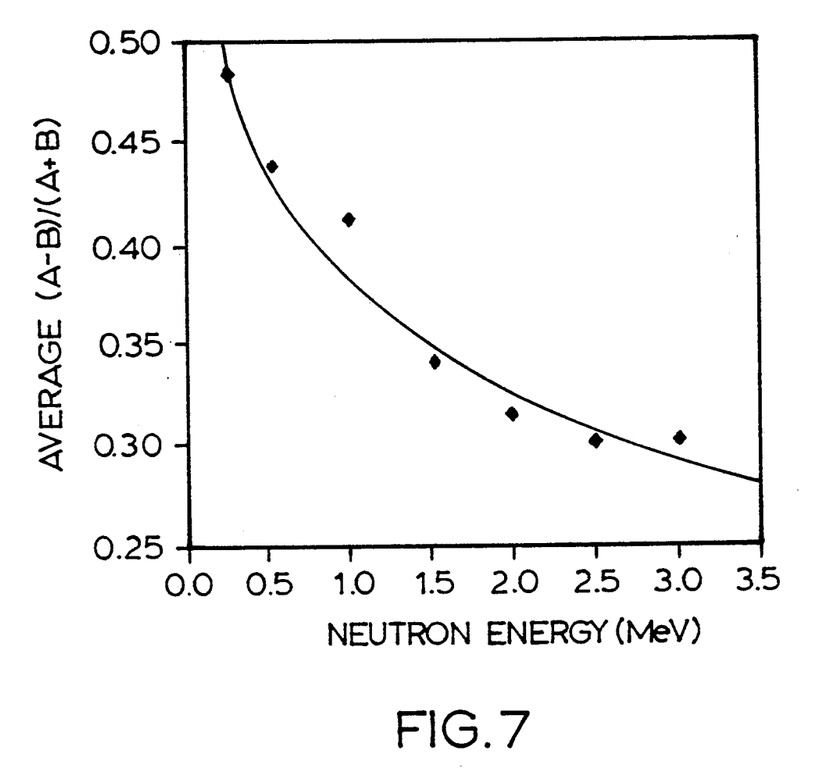
FIG. 7 is the average value of $(A-B)/(A+B)$ plotted as a function of neutron energy.

FIG. 7 is a plot of the average value of $(A-B)/(A+B)$ as a function of neutron energy. It is apparent that the quantity $(A-B)/(A+B)$ drops significantly as the neutron energy is raised to 3 MeV. Furthermore, the data demonstrate that the resolution of the sensor is high enough to resolve neutron energies from each other in the range of 0.2–3.0 MeV.

Figure 8:
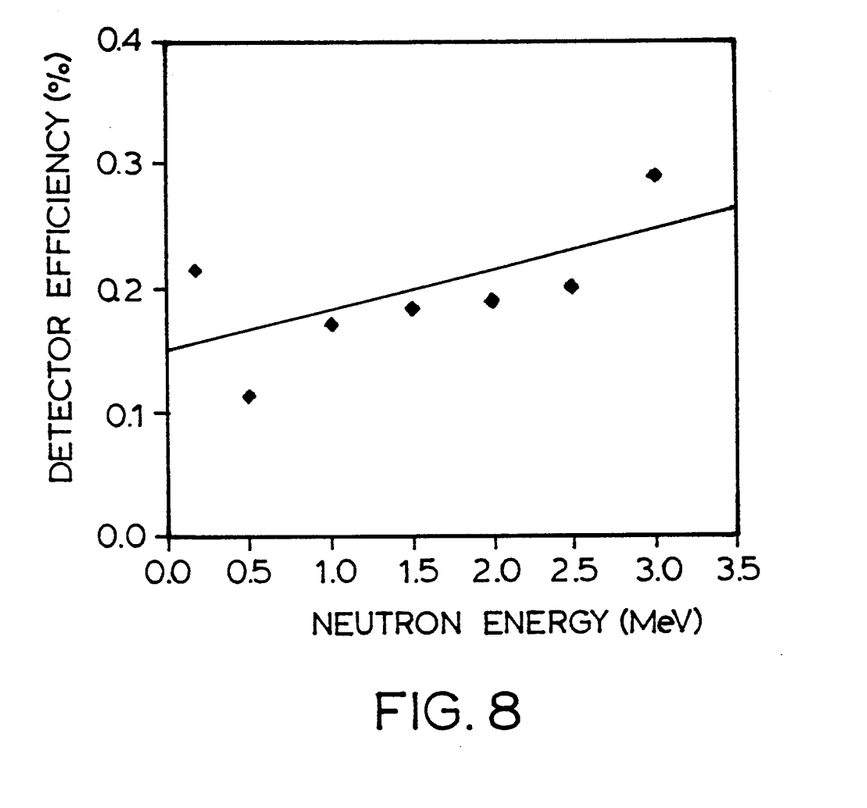
FIG. 8 shows the efficiency of a prototype fiber optic long counter system plotted as a function of incident neutron energy.

FIG. 8 shows the efficiency of the scintillator fiber optic long counter system as a function of neutron energy. The intrinsic efficiency for neutrons striking the detector is determined by normalizing the detector coincidence count rate by the number of neutrons striking the front face of the detector. the plot is reasonably flat over the 0.2-3.0 MeV range.

Figure 9:
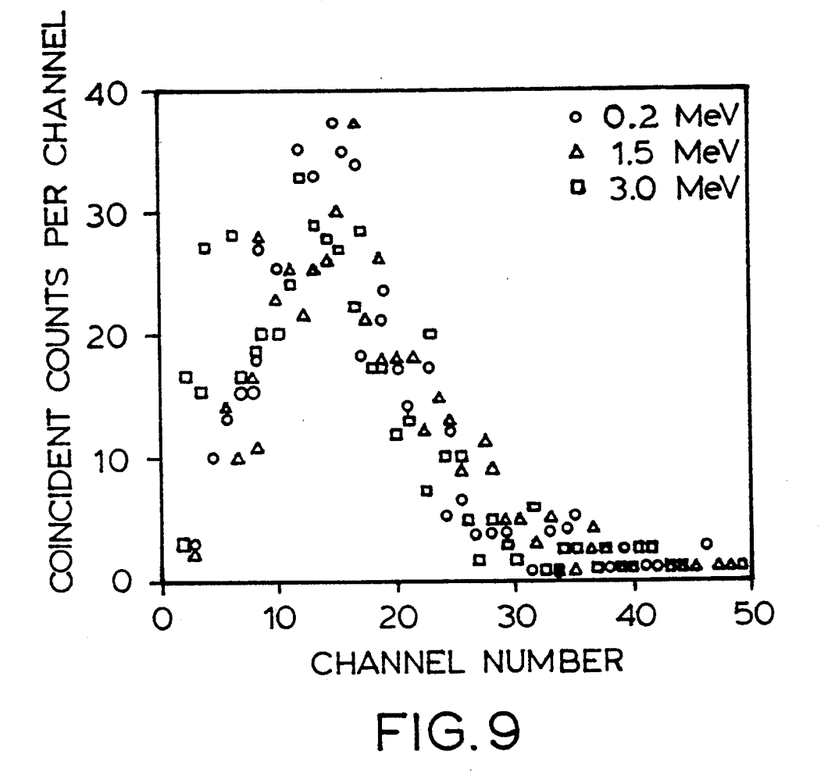
FIG. 9 is the thermal neutron peak obtained by plotting the pulse sums $A+B$ obtained at different neutron energies.

FIG. 9 is the thermal neutron peak obtained by plotting a histogram of the sum of A and B, the total pulse height obtained for each pair of coincident pulses. It is apparent that the peak concurs with the flat response of the scintillator detection element. While the present invention has been described with respect to an exemplary embodiment thereof, it will be understood by those of ordinary skill in the art that variations and modifications can be effected within the scope and the spirit of the invention.

I claim:

1. A flat response position sensing neutron detector for use in the collection of neutron spectroscopic data comprising:
   (a) detection means located in a housing, said housing having first and second ends;
   (b) first neutron moderation means surrounding said housing except for said first end defining an open end in said first neutron moderation means;
   (c) neutron shield means surrounding said first neutron moderation means except for said open end in said first neutron moderation means;
   (d) position sensing measurement means disposed at said first and second ends of said housing and connected to said detection means for determining the relative distance from said housing first end at which neutrons are detected, wherein neutrons enter said detection means exclusively through said open end to be moderated and sensed upon reaching thermalization level; and
   (e) means to determine the energy levels of the detected neutrons from information of the sensed positions of said neutrons.

2. The detector of claim 1 wherein said detection means are scintillator fibers.

3. The detector of claim 1 wherein said neutron shield means is comprised of a second neutron moderator means and a thermal neutron barrier.

4. The detector of claim 1 wherein there is a third neutron moderator means located in said housing in physical contact with said detection means.

5. The detector of claim 2 wherein said neutron shield means is comprised of a second neutron moderator means and a thermal neutron barrier.

6. The detector of claim 2 wherein there is a third neutron moderator means located in said housing in physical contact with said detection means.

7. The detector of claim 3 wherein there is a third neutron moderator means located in said housing in physical contact with said detection means.

* * * * *